US00RE38380E

(19) United States
(12) Reissued Patent
Libman et al.

(10) Patent Number: US RE38,380 E
(45) Date of Reissued Patent: Jan. 13, 2004

(54) WRINGER MOP

(76) Inventors: Robert J. Libman, 220 N. Sheldon, Arcola, IL (US) 61910-0068; Enzo Berti, Via Guolo, 15 int. 18/A, Dolo, Venezia 30031 (IT); Roberto Pellacini, Stamplast Parma S.N.C., strada provinciale, 10/A, 43010 Torrechiara, Langhirano, Parma (IT); Marco Bizzotto, Bizzotto Giovanni, Via A. Palladio, 51, 35010 Paviola, di S. giorgio, Bosco, Padova (IT)

(21) Appl. No.: 10/062,733

(22) Filed: Jan. 31, 2002

Related U.S. Patent Documents

Reissue of:
(64) Patent No.: 6,115,869
Issued: Sep. 12, 2000
Appl. No.: 09/199,216
Filed: Nov. 24, 1998

(51) Int. Cl.[7] ..... A47L 13/142

(52) U.S. Cl. ..... 15/120.1; 15/120.2

(58) Field of Search ..... 15/116.1, 119.1, 15/120.1, 120.2

(56) References Cited

U.S. PATENT DOCUMENTS

| | | | | | |
|---|---|---|---|---|---|
| 1,514,051 | A | * | 11/1924 | Jumonville | 15/120.2 |
| 1,520,500 | A | * | 12/1924 | Jumonville | 15/120.2 |
| 2,495,846 | A | * | 1/1950 | Johnson | 15/120.2 |
| 4,479,278 | A | * | 10/1984 | Heinonen | 15/120.2 |
| 5,509,163 | A | * | 4/1996 | Morad | 15/120.2 |
| 5,566,417 | A | * | 10/1996 | Hsieh | 15/120.2 |
| 5,642,551 | A | * | 7/1997 | Cann et al. | 15/120.1 |
| 5,675,858 | A | * | 10/1997 | von Meyer | 15/119.1 |
| 5,722,105 | A | * | 3/1998 | Thomasson | 15/120.2 |
| 5,850,658 | A | * | 12/1998 | Specht | 15/120.1 |

* cited by examiner

*Primary Examiner*—Mark Spisich
(74) *Attorney, Agent, or Firm*—Marshall, Gerstein & Borun LLP

(57) ABSTRACT

A wringer mop has a conventional handle with mop fibers extending from a lower point on the handle to a collar that can be lifted to a raised axial position and twisted to wring the mop. The mop also has a pawl on a ring fixed to the handle. When the mop is wrung, the pawl automatically engages a set of raised internal ribs inside the collar to prevent the mop from unwinding. The mop can be returned to normal use by simply pushing the collar down, without the need to fuss with button or levers to disengage the pawl from the ribs.

16 Claims, 2 Drawing Sheets

WRINGER MOP

Matter enclosed in heavy brackets [ ] appears in the original patent but forms no part of this reissue specification; matter printed in italics indicates the additions made by reissue.

CROSS-REFERENCE TO RELATED APPLICATIONS

Not applicable.

STATEMENT REGARDING FEDERAL SPONSORSHIP

Not applicable.

BACKGROUND OF THE INVENTION

This invention relates in general to wringer mops used to clean floors, and more particularly to so-called twist mops. In a twist mop, one end of the mop fibers is attached to a collar that can be twisted around the handle of the mop. The twisting action wrings the mop.

For some time it has been known that one of the problems with twist mops is that they have been difficult to wring adequately. Generally, more than one twist of the elements is required to obtain adequate wringing. Unfortunately, as described in U.S. Pat. No. 5,509,163, the mop tends to unwind as the user adjusts his or her hands to give the mop another twist. The awkward and laborious operation of repeatedly rotating the elements can be quickly tiring.

Several patents have been directed to trying to solve this problem.

The Morad patent, U.S. Pat. No. 5,509,163, appears to show a releasable pawl (65) that can be mounted on the collar (18). The pawl engages a set of ribs (64) on the handle (12), preventing the handle and collar from rotating with respect to each other. In order to wring the mop, the user is required to depress a portion of the pawl that projects through an aperture (20) in the collar (forming a sort of button) while twisting the collar with respect to the handle. The user then releases the button, causing the pawl to reengage the ribs (thus holding the handle and collar in place) while the user changes the position of his or her hands in order to give the mop another twist. One problem with this device is that it is inconvenient to hold down the button while twisting the mop. Another problem is that the use of a separate collar, rib, pawl, and spring is relatively expensive and may be prone to failure.

Similarly, the Hsieh patent, U.S. Pat. No. 5,566,417 appears to suggest the use of buttons that are pressed to temporarily lock the handle and collar together while the user adjusts his or her hands. Col. 8, lines 16–25.

The Sprecht application, international publication no. WO 97/24973, is also similar. In order to wring the mop, the user raises the collar (20) until a ratchet mechanism (23) on the collar nests within a spring-biased jaws (26, 27) mounted on the handle. The collar and handle can then be twisted with respect to each other while detents (31, 32) maintain the axial position of the collar with respect to the handle. After the mop is wrung, tabs (34, 35) on the jaws must be squeezed together in order to allow the collar to return to its lower position for mopping. This device appears to be relatively complicated, and thus costly and prone to breakage or failure.

The Cann et al. patents, U.S. Pat. No. 5,642,551, appears to teach that simpler solutions may be found by moving away from ratcheting mechanisms. The patent appears to show a mop with a sleeve (30) this is compressible against the handle (10). The compressibility of the sleeve enables the user to prevent the sleeve and handle from unwinding. The user simply presses the two elements together while he or she changes the position of his or her other hand on the handle. One problem with this design is that squeezing the elements together may itself be very tiring. Further, the mop does not appear to provide the user with a convenient way to change his or her grip on the collar without causing some unwinding.

What is needed is a simple self-wringing mop that is effective and easy to use.

BRIEF SUMMARY OF THE INVENTION

This invention is a twist mop that is simple, easy-to-use, and effective. The collar and handle stay in place while the user adjusts his or her hands, without the need for need for the user to bother with buttons or tabs, or to be tired by squeezing the pieces together.

Like most wringer mops, the mop has a handle with a collar in sliding engagement around the handle, with mop elements extending from a lower point on the handle to the collar. It differs, however, in how the collar and handle are maintained together while the user adjusts his or her hands.

Rotation is prevented by engagement of a set of resilient pawls with a set of raised ribs that extend parallel to the length of the handle. The ribs are preferably integrally formed on the internal surface of the collar, while the pawls are preferably formed on a ring fixed to the handle.

The pawls are disposed to engage the ribs to limit rotation of the collar to one direction around the handle when the collar is in a raised axial position on the handle. The ribs are extended, so the collar may move downwardly as it rotates without the pawls becoming disengaged. Once wringing is completed, the pawls can be disengaged from the ribs by simply sliding the collar further downwardly, toward its normal use position.

The design of the pawls is believed to be particularly advantageous. Preferably the pawls have a base that projects axially from a cylindrical section of the ring. A resilient arm extends from the base of the pawl at least partially circumferentially around the handle, at a spaced distance from the handle, and terminates in an extending end near the base of an adjacent pawl.

The resulting mop is simple to manufacture and easier to use than any previously-known wringer mop. Further advantages of the invention should be apparent to those skilled in the art from the upon review of the following detailed in conjunction with the drawings, in which:

DETAILED DESCRIPTION OF THE INVENTION

Figure 1:
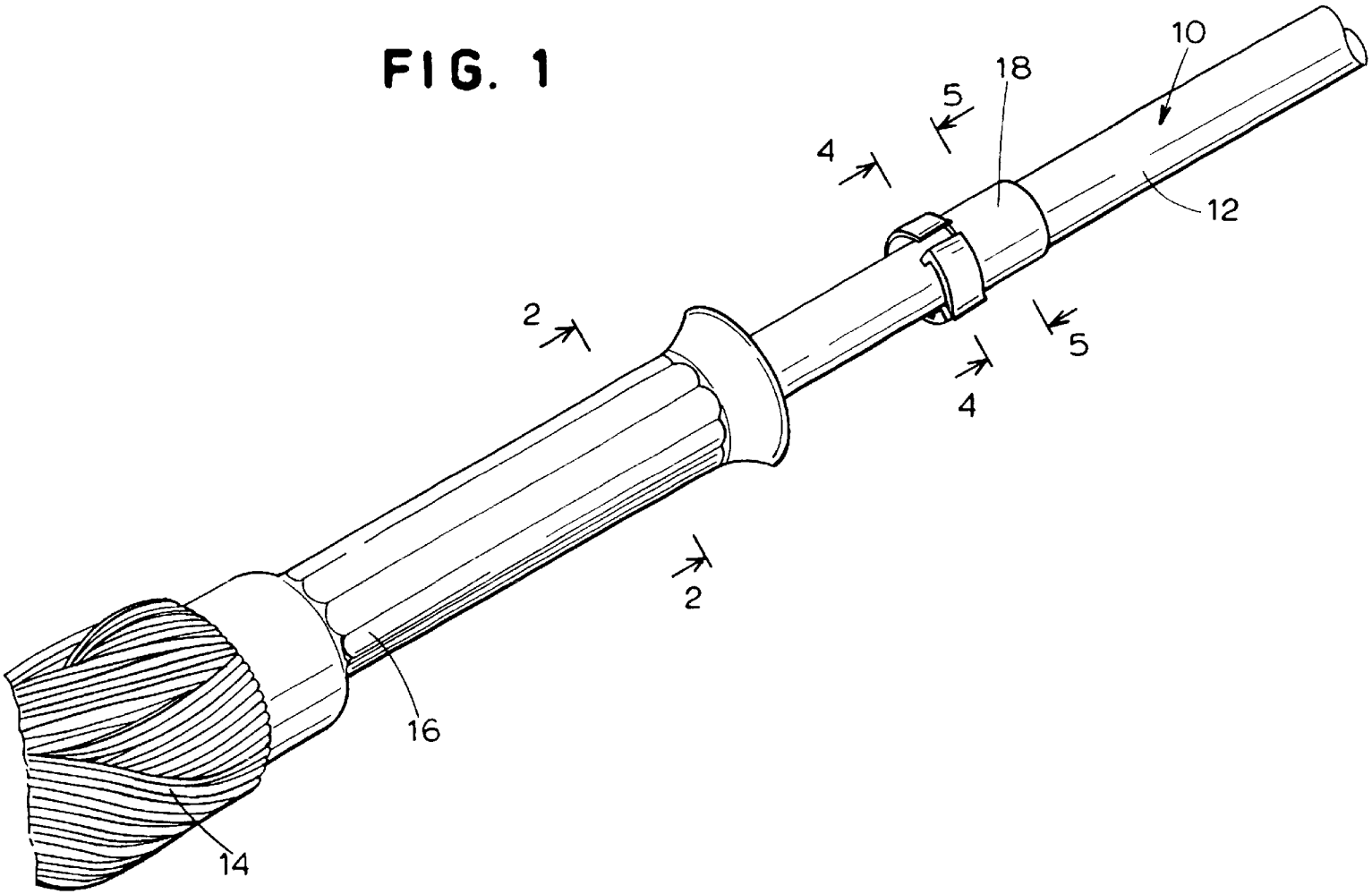
FIG. 1 is a partial perspective view of a wringer mop in accordance with an embodiment of this invention.

One embodiment of the twist mop is the subject of this invention is shown in FIG. 1. The principal components of the mop (10) are a handle (12), mop fibers (14), a collar (16), and a ring (18). The mop fibers are attached at one end to a lower point on the handle, and at the other end to the collar. The ring is fixed in place on the handle, while the collar can slide axially up and down the handle. For mopping, the collar slides to the bottom of the handle, putting the mop fibers in contact with the floor. For wringing, the collar is pulled upwardly over the ring, stretching the mop fibers over the lower part of the handle. The collar is then twisted with respect to the handle, twisting the fibers around the lower part of the handle and thus wringing the mop.

The handle (12) is a conventional one. Preferably, it is made of wood, plastic, or a composite material. It could also be made of solid or tubular metal. It is preferably about four feet long, and has an outside diameter of around an inch. A fitting (not visible) may be used at the lower end of the handle for anchoring one end of the mop fibers (14). The upper end of the handle may be provided with a hanging hook (not shown). The details of these elements are not important to this invention.

The mop fibers (14) are also conventional. Preferably, they are made of strands of absorbent material such as cotton. As illustrated, the mop (10) has around a hundred strands of fiber, each strand being about a foot and a half long. As illustrated, each strand is part of a single long piece of one quarter inch diameter cotton, which has been threaded back and forth between the collar (16) and the end of the handle (12). The configuration and composition of the mop fibers are not important to the invention, and other configurations and types of material could be used as alternatives.

Figure 2:
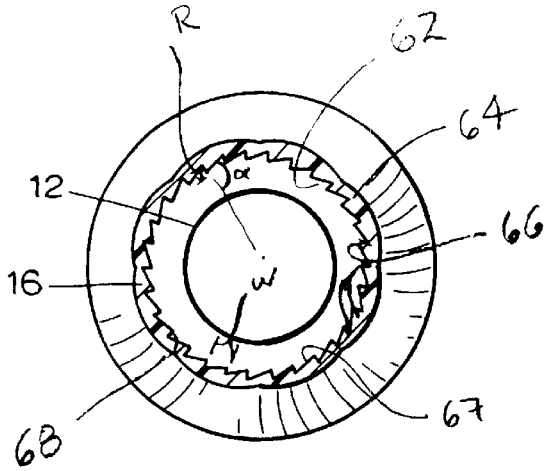
FIG. 2 is an enlarged cross-sectional view through lines 2—2 of FIG. 1.
Figure 3:
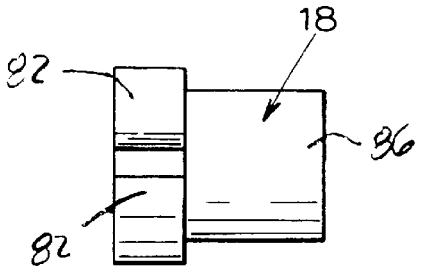
FIG. 3 is an enlarged side view of the ring used in the mop of FIG. 1.

As illustrated, the collar (16) is made of molded plastic, is about 7 or 8 inches long, and has an outside diameter of about an inch and a half. As seen in FIG. 2, the collar has an internal bore (62) leaving an inside surface (64) that fits loosely over the handle (12). As illustrated, the length of the handle and the space between the handle (12) and the inside surface (64) prevent undue wobbling of the collar with respect to the handle. These dimensions could be varied as desired.

A separate fitting (not visible) may be used for securing the mop fibers (14) to the collar (16). The details of the connection are not important to this invention.

The inside surface (64) of the collar (16) is provided with a set of raised ribs (66) that extend parallel to the length of the handle (12). As illustrated, there are around 35 ribs, each rib having an inclined side (67) and a short side (68), the inclined sides and short sides alternating around the inside surface. As illustrated, the width W of each rib is about an eighth of an inch, and the rise R of each rib is about a sixteenth of an inch. The angle $\alpha$ of the inclined side of each rib with respect to a radius through the centerline of the sleeve is about 105 degrees, while the angle of the short side of each rib with respect to a radius through the centerline of the sleeve is about 0° degrees. When using a pawl as illustrated, it is desirable that the angle of the short side of each rib be less than the angle $\alpha$. It is believed that the best results are obtained if the angle $\alpha$ is between about 60 and 120 degrees, while the angle of the short side of the rib is less than about 45 degrees. However, the dimensions can be varied.

Preferably, the ribs (66) are at least about 5 inches long, and extend downwardly from near the upper end of the collar (16).

Figure 4:
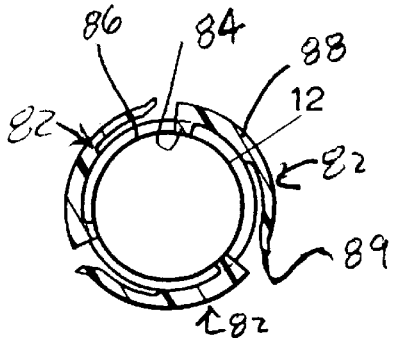
FIG. 4 is an enlarged cross-sectional view through lines 4—4 of FIG. 1.
Figure 5:
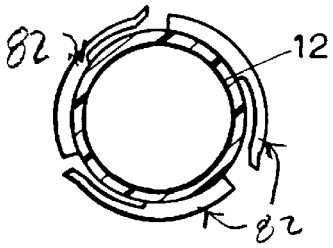
FIG. 5 is an enlarged perspective view through lines 5—5 of FIG. 1.

The ring (18) is preferably an annular unitary piece molded of a resilient plastic, such as nylon. The ring has three pawls (82) spaced around its periphery. Each pawl has a base (84) (FIG. 4) that projects axially from a cylindrical section (86) of the ring. The cylindrical section provides a convenient base for securing the ring to the handle, such as by a screw or rivet (not shown). As illustrated, the cylindrical section is about three quarters of an inch long and has an outside diameter that is about an eighth of an inch greater than the diameter of the handle (12). Preferably, the outside diameter is small enough to allow the sleeve (16) to easily pass over the cylindrical section.

Preferably, the base (84) of each pawl (82) projects axially from the cylindrical section (86) of the ring (18), and is strong enough to prevent the pawl from breaking off from the cylindrical section. As illustrated, the base of each pawl is about an eighth of an inch wide.

Each pawl (82) has a resilient arm (88) that extends from the base (84) and terminates in an extending end (89). Each arm extends at least partially circumferentially around the handle (12), and is spaced at a distance from the handle so that the extending end can be deflected inwardly toward the handle, but naturally tends to spring back to its normal position. As illustrated, the resilient arms are each about seven eighths of an inch long, about an eighth of an inch thick, and about three eighths of an inch wide. The extending end is angled at an angle with respect to a radius through the centerline of the handle (12) that is preferably close to the angle of the short side (68) of the ribs (66) a radius through the centerline of the collar (16).

For best results, it is preferred to use a set of pawls (82) evenly distributed around the periphery of the ring (18). Because no manual release mechanism is required for the pawls, the use of multiple pawls does not present any special difficulties. For maximum efficiency, the extending end (89) of each pawl may be disposed near the base (84) of an adjacent pawl.

The precise size, shape, and number of pawls (82) may vary. It is important, however, that the pawls be constructed so that they can engage the ribs (66) on the collar (16) to limit rotation of the collar with respect to the handle to a single direction. As illustrated, the resiliency of the arms (88) of the pawls and the spacing of the arms from the handle allows the collar to be rotated in the direction in which the extending ends (89) of the pawls ride up (that is, away from the centerline of the handle) the inclined sides (67) of the ribs. The relatively steepness of the short sides (68) of the ribs, however, and the corresponding steepness of the extending ends of the pawls effectively prevent the collar and handle from being rotated in the opposite direction.

When wringing the mop (10) with the collar (16) in its raised axial position, the user can release both the handle (12) and the collar without concern that the mop will unwind. The illustrated mop may even be left in an upright position, because it has been found that, after a twist or two, the friction between the pawls (82) and the ribs (66) is sufficient to maintain the collar in the raised position.

The length of the ribs (66) allows the collar (16) to move downwardly as the mop is twisted without the pawls (82) becoming unintentionally disengaged before the desired wringing is completed. Effective results may be obtained if the ribs are as short as two or three inches. By molding the ribs into the inside surface (64) of the collar, providing an extended length to the ribs is relatively easy, and does not present aesthetic problems.

This description of a self-wringing mop has been only that: a description. Those skilled in the art will appreciate that many modifications can be made to the method without departing from the spirit or scope of the invention, which is set forth in the following claims.

What is claimed is:

1. A wringer mop comprising:

a handle;

a collar in sliding engagement around the handle;

mop fibers extending from a lower point on the handle to the collar;

set of raised ribs on the collar extending parallel to the length of the handle; and a pawl comprising means for engaging the ribs to limit rotation of the collar to one direction around the handle when the collar is in a raised axial position on the handle, the collar being free to move downwardly as the collar and handle are rotated, and the pawl being disengageable from the ribs by sliding the collar downwardly from the raised axial position.

2. The wringing mop of claim 1, in which the ribs are at least about two inches long.

3. A wringer mop comprising:

a handle;

a collar in sliding engagement around the handle;

mop fibers extending from a lower point on the handle to the collar;

set of raised ribs extending parallel to the length of the handled; and a pawl with a base that projects axially from a cylindrical section of the mop and a resilient arm that extends from the base at least partially circumferentially around the handle, at a spaced distance from the handle, and terminates in an extending end, the pawl comprising means for engaging the ribs to limit rotation of the collar to one direction around the handle when the collar is in a raised axial position on the handle, the collar being free to move downwardly as the collar and handle are rotated, and the pawl being disengageable from the ribs by sliding the collar downwardly from the raised axial position.

4. The mop of claim 3, in which the pawl is one of a plurality of pawls that each comprise a base that projects axially from a cylindrical section of the mop, an extending end near the base of an adjacent pawl, and a resilient arm that extends at least partially circumferentially around the handle from the base to the extending end.

5. A wringer mop comprising:

a handle;

a collar in sliding engagement around the handle, the collar having a set of raised internal ribs extending parallel to the length of the handle;

mop fibers extending from a lower point on the handle to the collar;

a resilient pawl mounted to the handle, the pawl comprising means for engaging the ribs to limit rotation of the collar to one direction around the handle when the collar is in a raised axial position on the handle, the collar being free to move downwardly as the collar is rotated, and the pawl being disengageable from the ribs by sliding the collar downwardly from the raised axial position.

6. The mop of claim 5, in which the pawl is mounted on a ring on the handle.

7. The mop of claim 5, in which the pawl is one of a plurality of pawls formed on one axial end of a ring on the handle.

8. The mop of claim 5, in which the pawl comprises a base that projects axially from a cylindrical section of a ring on the handle, a resilient arm that extends from the base at least partially circumferentially around the handle, at a spaced distance from the handle, and terminates in an extending end.

9. The mop of claim 5, in which the pawl is part of a ring mounted on the handle, and is one of a plurality of pawls that each comprise a base that projects axially from a cylindrical section of the ring and a resilient arm that extends from the base at least partially circumferentially around the handle, at a spaced distance from the handle, and terminates in an extending end near the base of an adjacent pawl.

*10. A wringer mop comprising:*

*a handle;*

*a collar in sliding engagement around the handle;*

*mop fibers connected to an end of the handle;*

*a set of raised ribs extending parallel to the length of the handle; and*

*a pawl that limits rotation of the collar to one direction around the handle when the pawl engages the ribs while the collar is free to move axially with respect to the handle, the pawl being disengageable from the ribs by sliding the collar axially with respect to the handle, the pawl comprising (i) a base that projects axially from a cylindrical section of the mop and (ii) a resilient arm that extends from the base at least partially circumferentially around the handle, at a spaced distance from the handle, and terminates in an extending end.*

*11. The mop of claim 10, in which the mop comprises a plurality of pawls that each comprise (i) a base that projects axially from a cylindrical section of the mop, (ii) an extending end near the base of an adjacent pawl, and (iii) a resilient arm that extends at least partially circumferentially around the handle from the base to the extending end.*

*12. A wringer mop comprising:*

*a handle;*

*a collar in sliding engagement around the handle, the collar having a set of raised internal ribs extending parallel to the length of the handle;*

*mop fibers connected to an end of the handle; and*

*a resilient pawl that limits rotation of the collar to one direction around the handle when the pawl engages the ribs while the collar is free to move axially with respect to the handle, the pawl being disengageable from the ribs by sliding the collar axially with respect to the handle.*

*13. The mop of claim 12, in which the pawl is mounted on a ring on the handle.*

*14. The mop of claim 12, in which the pawl is one of a plurality of pawls formed on one axial end of a ring on the handle.*

*15. The mop of claim 12, in which the pawl comprises (i) a base that projects axially from a cylindrical section of a ring on the handle and (ii) a resilient arm that extends from the base at least partially circumferentially around the handle, at a spaced distance from the handle, and terminates in an extending end.*

*16. The mop of claim 12, in which the pawl is part of a ring mounted on the handle, and is one of a plurality of pawls that each comprise (i) a base that projects axially from a cylindrical section of the ring and (ii) a resilient arm that extends from the base at least partially circumferentially around the handle, at a spaced distance from the handle, and terminates in an extending end near the base of an adjacent pawl.*

* * * * *